United States Patent Office 3,048,026
Patented Aug. 7, 1962

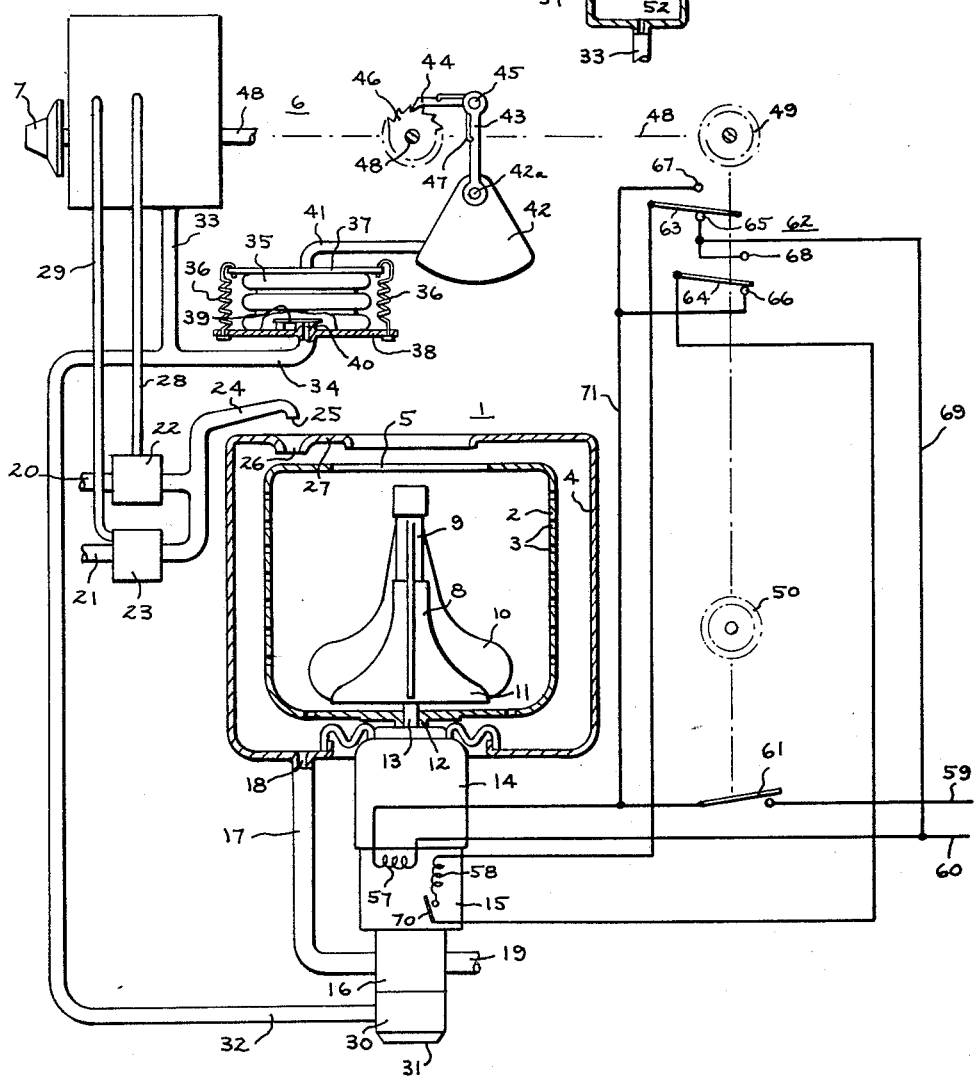

3,048,026
ARTICLE TREATING MACHINE WITH FLUID OPERATED SEQUENCE CONTROL MECHANISM
John Bochan and Philip H. Houser, Louisville, Ky., assignors to General Electric Company, a corporation of New York
Filed Aug. 7, 1961, Ser. No. 129,613
5 Claims. (Cl. 68—12)

This invention relates to article treating machines such as, for instance, clothes washing machines, which include a fluid operated sequence control mechanism for controlling the sequence in which operations are provided in such machines. More particularly, our invention relates to an article treating machine wherein a single-phase induction-type electric motor provides one type of operation when rotating in one direction and a different type of operation when rotating in the opposite direction, and wherein the sequence control mechanism is powered by a fluid compressor driven by the motor.

When the motor stops and reverses, the pressure furnished to the sequence control mechanism by the compressor necessarily stops, and it is an object of our invention to provide suitable means for continuing operation of the sequence control mechanism during the pauses between operations of the electric motor.

In one aspect of our invention, we provide an article treating machine wherein a first function is provided upon rotation of a reversible electric induction-type single-phase motor in one direction, and a second function is provided when the motor rotates in the opposite direction. The motor is of the conventional type which includes main and start windings connected in parallel, with speed responsive means for disconnecting the start winding as the motor comes up to speed. The motor drives transmission means and fluid compressor means; the transmission means provides the first function when the motor rotates in the first direction and the second function when the motor rotates in the other direction, and the fluid compressor passes fluid from an inlet to an outlet upon motor rotation in either direction. The motor is energized by a circuit which includes a first switch controlling circuit completion, and a second switch having two positions respectively connecting the windings for rotation in one direction or the other.

The proper sequence of functions in the machine is provided by sequence control means including a fluid operated motor which controls the switch means so as to provide electric motor operation and pauses in such operation in a predetermined sequence. To maintain the fluid motor operating during pauses in the electric motor operation, we provide, as an important feature of our invention, an expansible chamber which is biased to a contracted position, and which is connected both to the outlet of the compressor and to the fluid motor. The chamber is expanded by the compressor during operation of the electric motor, and has a capacity sufficient to maintain the fluid motor in operation during pauses in the electric motor operation so that a complete sequence of functions may be provided.

The subject matter which we regard as our invention is particularly pointed out and distinctly claimed in the concluding portion of this specification. The invention itself, however, both as to its organization and method of operation, may best be understood by reference to the following description taken in conjunction with the accompanying drawing.

In the drawing, FIGURE 1 is a schematic side-elevational representation of a fluid controlled article treating machine, more specifically, in this case, a clothes washing machine; and FIGURE 2 is a cross-sectional side-elevational view of a typical sequence control apparatus which may utilize fluid under pressure for the control functions it is required to perform.

Referring now to FIGURE 1, we have shown therein an agitator type clothes washing machine 1 with a conventional basket 2 which may be provided with perforations 3 and is disposed with an outer imperforate tub or casing 4. It will be understood that the entire structure of FIGURE 1 is conventionally mounted within a suitable appearance cabinet (not shown) with a suitable access opening to permit the insertion of clothes into basket 2 through an opening 5 in the top thereof. The cabinet also normally supports a suitable control structure, generally indicated by the numeral 6, provided with a suitable manual cycle selection control member 7.

At the center of basket 2 there is positioned a vertical axis agitator 8 which includes a center post 9 and a plurality of water circulating vanes 10 joined at their lower ends by an outwardly flared skirt 11. Both the clothes basket 2 and the agitator 9 are rotatably mounted. The basket is mounted on an outer shaft 12, and the agitator 9 is mounted on an inner shaft 13 rotatably secured relative to shaft 12. During a typical cycle of operation of the machine 1, the agitator conventionally is first oscillated by the shaft 13 back and forth on its axis in a horizontal plane within the basket 2 to wash the clothes therein after the introduction of washing liquid. Then, after a predetermined period of this washing action, the basket 2 is rotated at high speed through shaft 12 to extract centrifugally the washing liquid from the clothes and discharge it to drain, as will be explained. Following this extraction operation, a supply of clean liquid is introduced into the basket for rinsing the clothes and the agitator is again oscillated. Finally, the basket is once more rotated at high speed to extract the rinse water.

The basket 2 and agitator 8 may be driven through a suitable transmission means 14 from a reversing single-phase induction-type electric motor 15, inasmuch as the structure of the transmission means forms no part of the present invention. The transmission 14 supports and drives both the agitator drive shaft 13 and the basket mounting shaft 12. When motor 15 causes rotation in one direction, as will be explained herebelow, transmission 14 causes agitator 8 to oscillate in a substantially horizontal plane within the basket 2. Conversely, when motor 15 is driven in the opposite direction, the transmission rotates the wash basket 2 and agitator 8 together at high speed for centrifugal liquid extraction. While the drive mechanism forms no part of the invention, any suitable structure, such as, for instance, that shown and described in Patent 2,844,225 issued to James R. Hubbard et al. on July 2, 1958, and owned by the General Electric Company, assignee of the present invention, may be utilized.

In addition to operating the transmission 14 as described, motor 15 also drives a drain pump 16 which has an inlet connected by a conduit 17 to an opening 18 formed at the bottom of outer tub 4. Pump 16 also has an outlet which is connected by a conduit 19 to a suitable external drain (not shown). The pump 16 is not effective to drain the tub 4 upon motor rotation in the direction which causes oscillation of the agitator 8, but is effective to drain liquid and pass it out through conduit 19 to the external drain upon rotation of the motor in the direction to rotate the basket 2.

In order to introduce fresh water to the machine, suitable conduits 20 and 21 leading respectively to hot and cold water sources (not shown) are provided, and these two conduits lead respectively into a pair of valves schematically shown by the numerals 22 and 23. Valves 22 and 23 control the flow of hot and cold water respectively into a conduit 24 having an outlet 25 positioned in spaced relationship over an opening 26 formed in the top flange portion 27 of tub 4, so that suitable supplies of hot, cold and warm water may be introduced in the desired quantities into the tub 4 and basket 2. Any suitable valves for the purpose may be utilized; one such type of suitable valve is, for instance, fully described in my Patent 2,990,705 issued July 4, 1961 and assigned to the General Electric Company assignee of the present invention.

While any suitable means may be used to control these valves we propose, as mentioned in the above numbered patent, to provide air conduits 28 and 29 respectively to valves 22 and 23 so that when a fluid such as air is supplied under pressure through these conduits to the valves it causes the valves to open, and when the supply of air under pressure ceases, the valves close. Motor 15, in addition to driving the transmission 14 and the pump 16, is connected to an air compressor 30, the compressor being formed in a conventional manner so that during operation of motor 15 in either direction it draws air in through inlet 31 of compressor 30 and sends the compressed air from the outlet of the compressor through a conduit 32. It will readily be understood, in connection with the pump 16 and the compressor 30, that such structures are conventional and well known in their respective arts and that therefore the particular internal structure of each is not described herein in order not to unduly lengthen and complicate this disclosure.

As stated, when motor 15 operates, it pulls air in through inlet 31 of compressor 30; the compressor compresses the air to a relative high pressure, which may for instance be on the order of 10 p.s.i.g., and passes the air through conduit 32 to a pair of conduits 33 and 34 which lead respectively to the sequence control mechanism 6 and to an expansible chamber device 35. Chamber 35 may be in the form of a bellows, any suitable means such as springs 36 being provided securing the top 37 of the bellows to the base 38 thereof so as to have a compressive force thereon and so as to tend to contract the bellows as shown. The bellows is also preferably provided with a flap type check valve 39 so that air may freely pass from the compressor through conduits 32 and 34 into the bellows 35, but upon any tendency for a reverse flow the flap valve will shut against the outlet 40 of conduit 34. Thus, air may pass into the bellows from the compressor, but the reverse flow cannot occur.

From the bellows, there is a conduit 41 which extends to an air motor 42 pivotably mounted at 42a. While the internal structural details of air motor 42 are not shown, it will be understood that it may be of a conventional type such as is used, for instance, to operate windshield wipers in automobiles, so that a continual air pressure has the effect of providing a reciprocating motion. The air motor 42 has an extension 43 thereon on which a pawl 44 is pivotably mounted on a pin 45, the pawl being biased to engage a ratchet 46 by any suitable means such as a spring 47. Upon counter clockwise rotation of air motor 42, the pawl 44 engages the ratchet 46 to provide rotation of the ratchet upon its shaft 48, and upon the reverse clockwise rotation of the air motor 42 the pawl 44 slides up over the slanted face of a ratchet tooth to engage the next tooth so that the movement will be repeated upon a subsequent cycle. In this manner, air pressure provided by the compressor 30 will cause the air motor 42 to operate the ratchet 46.

As stated, the ratchet 46 is secured to a shaft 48 which extends into the closed part 48a of sequence control mechanism 6 so as to operate the parts therein; shaft 48 also provides the driving force for any desired number of cams such as those shown at 49 and 50 where it is necessary to control electrical switches, as is true in the case of the electric motor 15 which provides the power for the machine 1.

While any suitable means may be utilized to achieve fluid control of the various components of machine 1, a suitable structure for this purpose is shown in FIGURE 2. It can be seen therein that the structure 48a forms a closed chamber 51 connected to conduit 33 as previously mentioned, and where a suitable number of controlled outlets such as conduit 28 are also provided. The shaft 48 extends into the chamber 51 and drives a sprocket 52 which in turn drives a continuous band 53 positioned so as to cause the band to close the end opening of each of the control conduits (as shown in connection with conduit 28). In order to support the band 53 for this purpose, a suitable idler member 54 may be provided secured on a shaft 55.

The band 53 is formed with suitable openings, such as shown at 56, and when the air motor 42 has caused the shaft 48 to rotate the sprocket 52 sufficiently for band 53 to have opening 56 aligned with conduit 28, the air from the compressor 30 may then pass through the conduit 28 to control the component at the end thereof (in this case the valve 22). In this manner, the air compressor 30 may be utilized to control components substantially in the same manner that the keys are depressed in a conventional player piano.

Referring now to the motor 15 again, it includes a main winding 57 and a start winding 58, and in the conventional manner these two windings are connected in parallel (the precise connection is to be more fully set forth herebelow), and are spaced from each other in space and phase so that with both windings energized, a starting torque in one direction is provided with one connection of the windings, and when one of the windings is reversed relative to the other a reverse starting torque is provided and the motor rotates in the opposite direction.

In order to energize the windings 57 and 58, a pair of supply conductors 59 and 60 are provided and are adapted to be connected across a suitable source of power, such as the conventional 60 cycle 110 volt power conventionally available for residential use. Conductor 59 leads to a switch 61 which is movable by cam 50 between open and closed positions so as to control the energization of the motor. The energizing circuit extends, in part, from switch 61 through the main winding 57 and then back through supply conductor 60.

The part of the circuit which energizes start winding 58 also includes a pair of contact arms 63 and 64 controlled by cam 49 so as to be movable to one of two operative positions. In thhe position shown, arm 63 engages a contact 65 and arm 64 engages a contact 66. In the other position, both arms move up so that arm 63 engages a contact 67 and arm 64 engages a contact 68. With switch 62 in the position shown, the start winding 58 is energized in parallel with main winding 58 as follows: from conductor 60, a conductor 69 extends to contact 65, and then the circuit continues through contact arm 63, the start winding, a speed responsive switch mechanism 70, contact arm 64, contact 66, a conductor 71, and back to conductor 59. It will be understood that the speed responsive switch mechanism 70 may be of any suitable type; for instance, it may either be of the mechanical type wherein centrifugal force is used, or may be a relay responsive to the variations in the motor electric characteristics which occur with speed. In either event, the member 70 opens the connection of the winding 58 as the motor comes up to speed so that the motor then continues to run on the winding 57 alone, the winding 58 being used only for starting purposes.

To start the motor in the opposite direction, the switch 62 is moved by cam 49 to its up position. Then the energizing circuit for winding 58, starting with conductor 69, extends through contact 68, contact arm 64, switch 70 and winding 58, contact arm 63, contact 67 and then through conductor 71 back to conductor 59. It will be observed that with this arrangement of switch 62 the connection of winding 58 relative to winding 57 is reversed so that a reverse direction of rotation is obtained when switch 70 is closed.

It will be understood that motor 15 causes oscillation of agitator 8 with switch 62 in the position shown, and causes rotation of the basket 2 when the switch is moved to its up position by cam 49. It will thus be seen that, when the machine is started by manually operating member 7 to rotate shaft 48 until cam 50 closes switch 61 with switch 62 in the position shown, motor 15 will start. The starting of motor 15 operates compressor 30, causing air to pass through conduit 32 and then through conduit 33 to the pneumatic control 6, and also through conduit 34, chamber 35, and conduit 41 to the air motor 42. The air motor 42 will cause continued movement of the shaft 48 so that the pneumatically operated devices will be controlled by member 6, and the electrical switches will be controlled by the cams to give the cycle mentioned above.

Reversing of switch 62 when the motor 15 is operating at normal speed is without effect since switch 70 is opened. In order to take care of this, it is a conventional procedure to provide pauses in the motor operation by opening the switch 61 so that the motor may stop, and then be started again with the switch 62 in reversed position. This stopping causes the switch 70 to close so that the reverse position of switch 62 does have the effect of starting the motor 15 in the opposite direction to that previously provided when switch 61 is reclosed. However, there is the problem that, when motor 15 stops, operation of the compressor 30 stops and therefore the air motor 42—unless some provision is made to correct the situation—ceases to cause rotation of the shaft 48.

This would mean that once a pause is reached nothing further would happen until member 7 were manually operated to move shaft 48 to a position where the motor is started up again. To take care of this situation, we provide the expansible chamber 35 biased to a contracted position. When the compressor is operating, the air forces the bellows 35 to an expanded position against the action of springs 36. However when the compressor ceases to operate, the springs 36 cause the bellows to start to contract with the result that air is forced out through conduit 41 to motor 42 causing the air motor to continue operation. It will be understood that the motor 42 and the bellows 35 may readily be designed so as to insure that the air motor is operable by the bellows for a period adequate to cover the pause caused by opening of switch 61.

In this manner, the use of an air motor for the operation of the sequence control is feasible with a reversing motor drive system; this is highly advantageous inasmuch as air motors and pneumatic controls represent a very economical means of achieving control of a washing machine, and in further view of the fact that a reversing motor system is considered to be a highly economical means of achieving the two different functions such as are required in a washing machine (agitation and spinning).

While in accordance with the Patent Statutes we have described what at present is considered to be the preferred embodiment of our invention, it will be obvious to those skilled in the art that various changes and modifications may be made therein without departing from the invention, and we therefore aim in the appended claims to cover all such changes and modifications as fall within the true spirit and scope of our invention.

What we claim as new and desire to secure by Letters Patent of the United States is:

1. An article treating machine comprising: means for providing a first function within said machine; means for providing a second function within said machine; a reversible electric induction-type single-phase motor including main and start windings connected in parallel, and speed responsive means for disconnecting said start winding as said motor comes up to speed; transmission means and fluid compressor means driven by said motor, said transmission means operating said first function providing means upon motor operation in one direction and operating said second function providing means upon motor operation in the other direction, said compressor having an inlet and an outlet and being formed to pass fluid from said inlet to said outlet upon motor rotation in either direction; an energizing circuit for said motor including first switch means movable to open and closed positions to control circuit completion, and second switch means having first and second positions respectively connecting said windings for rotation in said one direction and in said other direction; sequence control means including a fluid operated motor, and means operated by said fluid motor controlling said switch means to provide electric motor operation and pauses in such operation in a pre-determined sequence; means connecting said fluid motor to said compressor outlet; an expansible chamber biased to a contracted position; and means connecting said chamber to said compressor and to said fluid motor; said chamber expanding during compressor operation and having a capacity sufficient to maintain said fluid motor in operation during pauses in said electric motor operation.

2. The apparatus defined in claim 1 wherein said expansible chamber is a bellows.

3. The apparatus defined in claim 1 including check valve means arranged to prevent fluid flow from said chamber toward said compressor.

4. The apparatus defined in claim 1 wherein said means connecting said chamber to said compressor outlet and to said fluid motor cooperate to form said means connecting said fluid motor to said compressor outlet.

5. A clothes washing machine comprising: a rotatable clothes container; means for treating clothes positioned within said container; a reversible electric induction-type single-phase motor including main and start windings connected in parallel and speed responsive means for disconnecting said start winding as said motor comes up to speed; transmission means and air compressor means driven by said motor, said transmission means rotating said container upon motor operation in one direction and providing said clothes treating means with a clothes washing motion upon motor operation in the other direction; said compressor means having an inlet and an outlet and being formed to pass air from said inlet to said outlet upon motor rotation in either direction; an energizing circuit for said motor including first switch means movable to open and closed positions to control circuit completion and second switch means having first and second positions respectively connecting said windings for rotation in said one direction and in said other direction; sequence control means including an air operated motor, and means operated by said air motor controlling said switch means to provide electric motor operation and pauses in such operation in a predetermined sequence; means connecting said air motor to said compressor means outlet; an expansible chamber biased to a contracted position; and means connecting said chamber to said compressor means outlet and to said air motor; said chamber expanding during compressor means operation and having a capacity sufficient to maintain said air motor in operation during pauses in said electric motor operation.

References Cited in the file of this patent

UNITED STATES PATENTS

| | | |
|---|---|---|
| 2,960,856 | Bauerlein et al. | Nov. 22, 1960 |
| 2,966,050 | Kellerman | Dec. 27, 1960 |
| 2,990,705 | Bochan | July 4, 1961 |